US009734495B2

(12) United States Patent
Rose et al.

(10) Patent No.: US 9,734,495 B2
(45) Date of Patent: Aug. 15, 2017

(54) MOBILE COMMERCE AUTHENTICATION AND AUTHORIZATION SYSTEMS

(75) Inventors: Gregory Gordon Rose, San Diego, CA (US); Craig B. Lauer, San Diego, CA (US); Joan T. Waltman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 12/789,722

(22) Filed: May 28, 2010

(65) Prior Publication Data

US 2011/0131104 A1 Jun. 2, 2011

Related U.S. Application Data

(60) Provisional application No. 61/183,501, filed on Jun. 2, 2009.

(51) Int. Cl.
*G06Q 20/32* (2012.01)
*G06Q 20/20* (2012.01)
*G06Q 20/42* (2012.01)

(52) U.S. Cl.
CPC ............ *G06Q 20/32* (2013.01); *G06Q 20/20* (2013.01); *G06Q 20/204* (2013.01); *G06Q 20/425* (2013.01)

(58) Field of Classification Search
None
See application file for complete search history.

(56) References Cited

U.S. PATENT DOCUMENTS 6,434,159 B1 8/2002 Woodward et al.
6,970,850 B1 11/2005 Freeny, Jr.
(Continued)

FOREIGN PATENT DOCUMENTS

JP 2002366870 A 12/2002
KR 20080100801 A 11/2008
(Continued)

OTHER PUBLICATIONS

International Search Report and Written Opinion—PCT/US2010/036884, ISA/EPO—Sep. 1, 2011.
Taiwan Search Report—TW099117457—TIPO—Aug. 22, 2013.

*Primary Examiner* — F. Zeender
*Assistant Examiner* — Denisse Ortiz Roman
(74) *Attorney, Agent, or Firm* — Won Tae C. Kim

(57) ABSTRACT

Mobile commerce authentication and authorization systems enable currently existing point-of-sale devices that are neither structurally nor systemically altered to conduct financial transactions with a customer using an access terminal across a wireless communications system. The point-of-sale devices receive an input from a payment instrument replacement, which identifies the transaction to the point-of-sale device as a transaction including an access terminal. Authentication of the user of the access terminal is achieved at least by application of position and/or location determinable features of the access terminal, the position and/or location of a point-of-sale device of a vendor or merchant where the customer seeks to purchase goods or services, and the payment sum entered on the point-of-sale device. A payment matching server may assist in processing the location data and the payment sum amount across communications network.

16 Claims, 9 Drawing Sheets

(56) References Cited

U.S. PATENT DOCUMENTS

| | | |
|---|---|---|
| 7,669,759 B1 * | 3/2010 | Zettner .................. 235/380 |
| 2002/0108062 A1 | 8/2002 | Nakajima et al. |
| 2003/0014372 A1 * | 1/2003 | Wheeler ................ G06F 21/32 |
| | | 705/71 |
| 2003/0169881 A1 | 9/2003 | Niedermeyer |
| 2005/0125295 A1 | 6/2005 | Tidwell et al. |
| 2005/0177442 A1 * | 8/2005 | Sullivan et al. .............. 705/26 |
| 2007/0055785 A1 | 3/2007 | Stevens |
| 2007/0174082 A1 | 7/2007 | Singh |
| 2007/0244811 A1 | 10/2007 | Tumminaro |
| 2008/0238610 A1 | 10/2008 | Rosenberg |
| 2008/0249939 A1 * | 10/2008 | Veenstra .................... 705/44 |
| 2008/0319869 A1 * | 12/2008 | Carlson ................ G06Q 20/02 |
| | | 705/26.1 |
| 2009/0187492 A1 * | 7/2009 | Hammad ............. G06Q 10/087 |
| | | 705/26.1 |
| 2010/0049615 A1 | 2/2010 | Rose et al. |
| 2010/0131415 A1 * | 5/2010 | Sartipi .................. G06Q 20/02 |
| | | 705/75 |

FOREIGN PATENT DOCUMENTS

| | | |
|---|---|---|
| KR | 2010022170 | 3/2010 |
| TW | 200401552 A | 1/2004 |

* cited by examiner

MOBILE COMMERCE AUTHENTICATION AND AUTHORIZATION SYSTEMS

CLAIM OF PRIORITY UNDER 35 U.S.C. §119

The present application for patent claims priority to Provisional Application No. 61/183,501 entitled "A Mobile Commerce Authentication and Authorization System" filed Jun. 2, 2009, and assigned to the assignee hereof and hereby expressly incorporated by reference herein.

BACKGROUND

Field

Various features disclosed herein pertain to mobile commerce authentication and authorization systems, and at least some features pertain to devices and methods for facilitating authenticated and authorized commercial transactions across a wireless communications system.

Background

Merchants, vendors, credit card associations including VISA® and MasterCard® that act as gateways between a financial institution and an issuer for authorizing and funding purchases, and users of access terminals (e.g., mobile wireless communications instruments), all desire to conduct and close purchases and sales quickly and expeditiously. At least one concern is security, including acceptable and proper authorization and authentication that gives a vendor and a customer confidence that a fraudulent transaction will not occur.

Current constructs for effecting consumer purchases across a credit network generally are limited to use of a payment instrument in connection with a purchase. Currently, a consumer must have in possession a payment instrument such as a plastic credit card or debit card having a magnetic strip. Alternatively, "contactless" payment instruments may be used. At the point-of-sale, a credit card reader, terminal, or similar point-of-sale payment device is provided that requires the consumer to successfully swipe a payment instrument through the point-of-sale device. Over time, repetitive use degrades the magnetic strip on the payment instrument, and the data embedded in the magnetic strip may become unreadable by a point-of-sale device for a variety of reasons. Degradation of the magnetic strip may cause payment rejection although the consumer may be the authentic owner of the payment instrument. Even in the case of contactless payment instruments, authentication or verification of the customer is limited to data and information embedded in the payment instrument. Whoever possesses the payment instrument can effect purchases. The use of personal identification numbers solves neither the problems of customer identification nor customer authorization. Even customer authentication fails to overcome problems resulting from lost or stolen payment instruments, degraded instruments, or loss of functionality between the payment instrument and point-of-sale payment devices.

There is a worldwide need, therefore, for a secure point-of-sale payment system that substantially automatically authenticates a customer and substantially automatically initiates a payment for sales and purchases of goods and services on entry of a consumer or customer into a business or into a geographic area surrounding a business that includes use of a portable, or mobile, access terminals now commonly in possession of consumers worldwide. At least one example of such a portable, or mobile, access terminals or wireless communications device is a cellular telephone, but any access terminal to which a computer and/or data processing system may be operatively connected may be used.

Most proposed mobile commerce solutions for conducting purchases using an access terminal such as a cellular telephone require the point-of-sale device and/or the access terminal to be altered either structurally or systemically by adding hardware, software, and/or combinations of hardware and software. For example, although Near Field Communication ("NFC") offers solutions in this field, the point-of-sale device must be adapted to communicate with an NFC-adapted mobile wireless communications device. The only advantage of enabling a customer to use a cellular telephone is that the user is, these days, likely to have a cellular telephone in possession. However, the need for major alterations of the point-of-sale device, as well as to the access terminal, and other infrastructure equipment to support the NFC-operable device, substantially reduce the likelihood of universality of use.

There is a need for a secure mobile commerce payment system that may be implemented with existing or legacy point-of-sale devices, without substantial alterations to the point-of-sale devices.

SUMMARY

Payment and financial transactions are facilitated between two parties by utilizing a payment instrument replacement at a point-of-sale device to facilitate processing of the transaction using a payment matching server.

One feature provides a point-of-sale device for facilitating a payment transaction using a payment matching server. The point-of-sale device may include a network communication interface for communicating over a network. A payment input module may be included for receiving one or more forms of payment for a transaction. A processing circuit may be coupled to the network communication interface and the payment input module, and may be adapted to compute a transaction amount for a commercial transaction. When a payment instrument replacement is received at the payment input module, the processing circuit may receive an input from the payment input module that indicates a customer is using an access terminal for payment. Such an input may be the same input for any customer, irrespective of the customer's identity. Furthermore, such an input may be disassociated with a customer account.

The processing circuit may be further adapted to send a payment request message to a payment matching server when the input is received from the payment input module. The payment request message may include the transaction amount and one or more location parameters. A location parameter may include one or more of a vendor name, a vendor identifier, a vendor location and/or a cashier identifier.

A method operational at a point-of-sale device is also provided according to one feature for facilitating a payment transaction using a payment matching server. For instance, when a customer requests to pay using an access terminal, the point-of-sale device may facilitate the payment by computing a transaction amount. An input may be received from a payment instrument replacement, which input may indicate that the payment transaction is being performed with an access terminal. A payment request message may be generated including the transaction amount and one or more location parameters and the payment request message may be sent to a payment matching server. Such a payment matching server may compare the payment request message with a payment message from the access terminal to effectuate the transaction.

One feature provides a payment instrument replacement adapted to be received by a payment input module of a point-of-sale device. The payment instrument replacement may include a storage medium including information adapted to trigger processing of a payment transaction at a point-of-sale device by a payment matching server. Such a payment matching server may compare a payment request message from the point-of-sale device with a payment message from an access terminal to effectuate the transaction. The payment instrument replacement may further include an information-conveying interface that is readable by the point-of-sale device for conveying the information stored thereon to the point-of-sale device.

A method of using a payment instrument replacement is provided according to one feature for facilitating a payment transaction. Initially, information may be stored, which information may be adapted to trigger processing of the payment transaction at a point-of-sale device by a payment matching server. Such a payment matching server may compare a payment request message from the point-of-sale device with a payment message from an access terminal to effectuate the transaction. The information may then be conveyed to a point-of-sale device.

According to one feature, a method of facilitation a payment transaction using a point-of-sale device, an access terminal and a payment matching server is provided. A transaction amount may be computed at the point-of-sale device. Information may be input into the point-of-sale device from a payment instrument replacement to indicate the payment transaction is being performed with a customer's access terminal. The point-of-sale device may send a first payment request message to a payment matching server. The first payment request message may include the transaction amount and at least one sale device location parameter. The access terminal may send a second payment request message to the payment matching server. The second payment request message may also include the transaction amount as well as at least one access terminal location parameter. The payment matching server may verify that the first payment request message and the second payment request message include information that is at least substantially the same. If at least some of the information matches, the payment matching server may send a transaction confirmation message to the access terminal and the point-of-sale device. If the information does not substantially match, the payment matching server may send a transaction denial message to the access terminal and the point-of-sale device.

A system for facilitating a payment transaction is provided according to one feature. The system includes a point-of-sale device, an access terminal and a payment matching server. The point-of-sale device may be adapted to send a first payment request message over a network when a payment instrument replacement is received at a payment input module of the point-of-sale device. The first payment request message may include a transaction amount and at least one location parameter. The access terminal may be adapted to send a second payment request message over a wireless network to the payment matching server. The second payment request message may include the transaction amount and at least one location parameter. The payment matching server may receive the first and second payment request messages and may verify that the transaction amount and the at least one location parameter in the two messages match in order to authenticate and authorize the payment transaction.

Yet another feature provides a machine readable medium including one or more instructions to facilitate a transaction using a payment matching server. The one or more instructions may be adapted to cause a processor to generate a payment request message including a transaction amount and one or more location parameters, and send the payment request message to a payment matching server.

DETAILED DESCRIPTION

Figure 1:
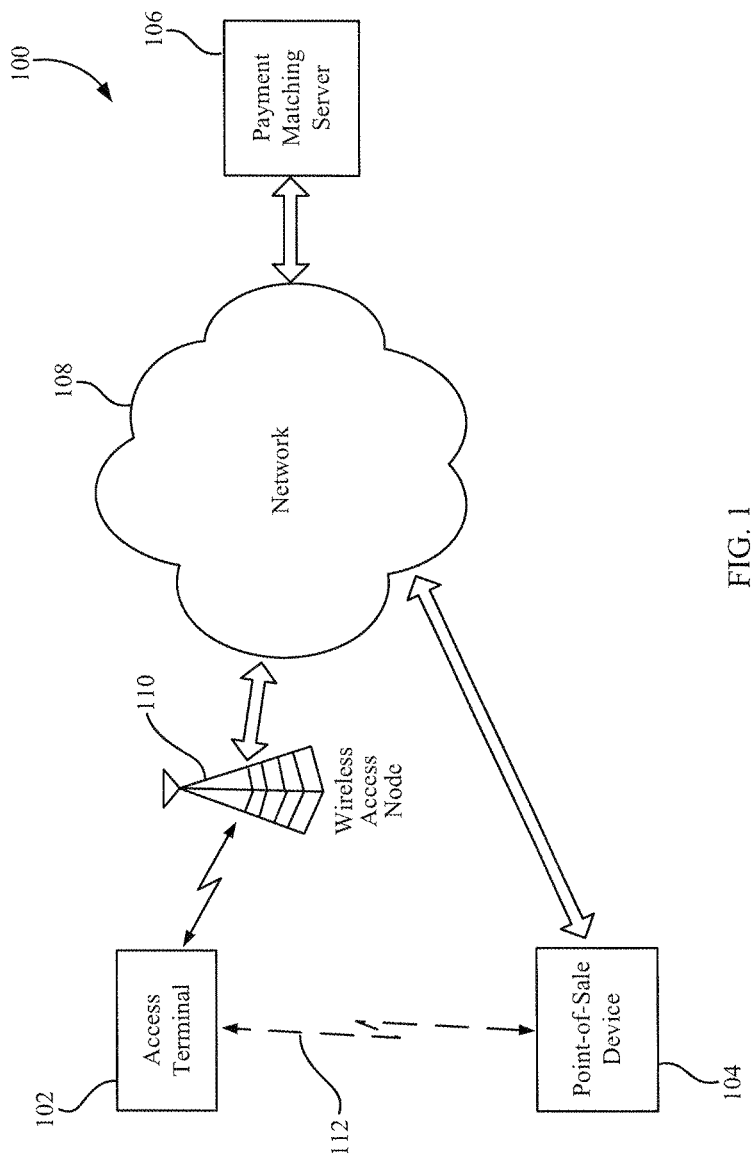
FIG. 1 is a block diagram illustrating how one or more components of a payment authentication and authorization system may operate within a communication network.

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

In the following description, certain terminology is used to describe certain features. The term "point-of-sale device" includes at least a terminal or other device that may function like a cash register or similar device for recording sales. A point-of-sale device may include credit card and debit card readers that may include touch screens, and conventional cash registers, as well as automatic and automated teller machines ("ATM's"), among others. The location of the point-of-sale device may be determined by any means of determining location parameters discussed in this document. The term "unmodified" as it relates to a point-of-sale device means a point-of-sale device that has not been altered structurally, mechanically or systemically. The term "payment instrument" may include a credit card, a debit card, a contactless card, debit lines, debit coupons, and cash equivalents, among others. The term "access terminal", which may also be characterized as a "mobile device", may include mobile phones, pagers, wireless modems, personal digital assistants, personal information managers (PIMs), palmtop computers, laptop computers, and/or other mobile communication/computing devices which communicate, at least partially, through a wireless or cellular network (e.g., wireless, infrared, short-range radio, etc.).

Overview

One feature provides a system, apparatus and methods for facilitating authentication and/or authorization of a payment transaction that includes use of an access terminal. Payment transactions with an access terminal may be carried out by utilizing the existing electronic payment (e.g., credit card, bank cards, etc.) processing infrastructure already available to most existing and/or legacy point-of-sale devices. A cashier may have access to a payment instrument replacement (e.g., a card) that works like a conventional payment instrument (e.g., magnetic stripe credit card), so that it can be read by the existing equipment (e.g., card reader) on the point-of-sale device. However, the payment instrument replacement includes information that initiates the special kind of transaction with the backend payment matching server. For instance, from the point of view of the point-of-sale device, it is merely processing and forwarding information for a typical credit or bank card. However, the transaction is routed to and processed by the payment matching server. The payment matching server recognizes that the requested transaction involves an access terminal and awaits authentication and authorization from the access terminal prior to authorizing the transaction.

A consumer does not need to possess a payment instrument at the time of a transaction; or to know or recall information such as a password, a personal identification number, or personal details often forgotten; or to be someone identified by such characteristics as biometric fingerprints, appearance, or similar personal details. Instead, the system achieves authentication and authorization, and consequent trustworthiness, using at least two determinable parameters that are combined to eliminate concern about further authentication and authorization. In combination, the two parameters support the presumption that the same payment sum will not be requested for payment by an access terminal and a point-of-sale device found in substantially the same location and at substantially the same time, unless the transaction is purposeful (i.e., not fraudulent) on behalf of both parties involved.

Exemplary Network Environment

FIG. 1 is a block diagram illustrating how one or more components of a payment authentication and authorization system may operate within a communication network. A payment authentication and authorization system 100 may comprise an access terminal 102, a point-of-sale device 104 and a payment matching server 106. The access terminal 102 and point-of-sale device 104 may communicate with the payment matching server 106 through a communication network 108.

The access terminal 102, may be capable of wirelessly communicating with the payment matching server 106 through the communication network 108. At least some implementations of an access terminal 102 may be adapted to communicate through the communication network 108 via one or more wireless access nodes 110. Such an access node 110 may comprise a base station or Node B, a femto cell, a pico cell, or any other device that facilitates wireless connectivity for one or more access terminals 102 to the communication network 108. By way of example and not limitation, the access terminal 102 may be adapted to communicate via various types of wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, and/or Worldwide Interoperability for Microwave Access (Wi-Max). A CDMA system may implement a radio access technology (RAT) such as Wideband CDMA (W-CDMA), CDMA2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available.

The point-of-sale device 104 is adapted to receive and process payment data. Such payment data may be transmitted across the communication network 108 via a wired and/or wireless link to the communication network 108. In addition, the point-of-sale device 104 may be adapted to communicate directly with the access terminal 102 via a wireless link 112. For example, the point-of-sale device may be adapted to communicate data and information, including a purchase sum or amount, to an access terminal 102. In some implementations, the point-of-sale device 104 and the access terminal 102 may be adapted to be communicatively connected via peer-to-peer near field communications (e.g., Bluetooth, ZigBee).

Exemplary Authentication and Authorization of a Payment Transaction

Figure 2:
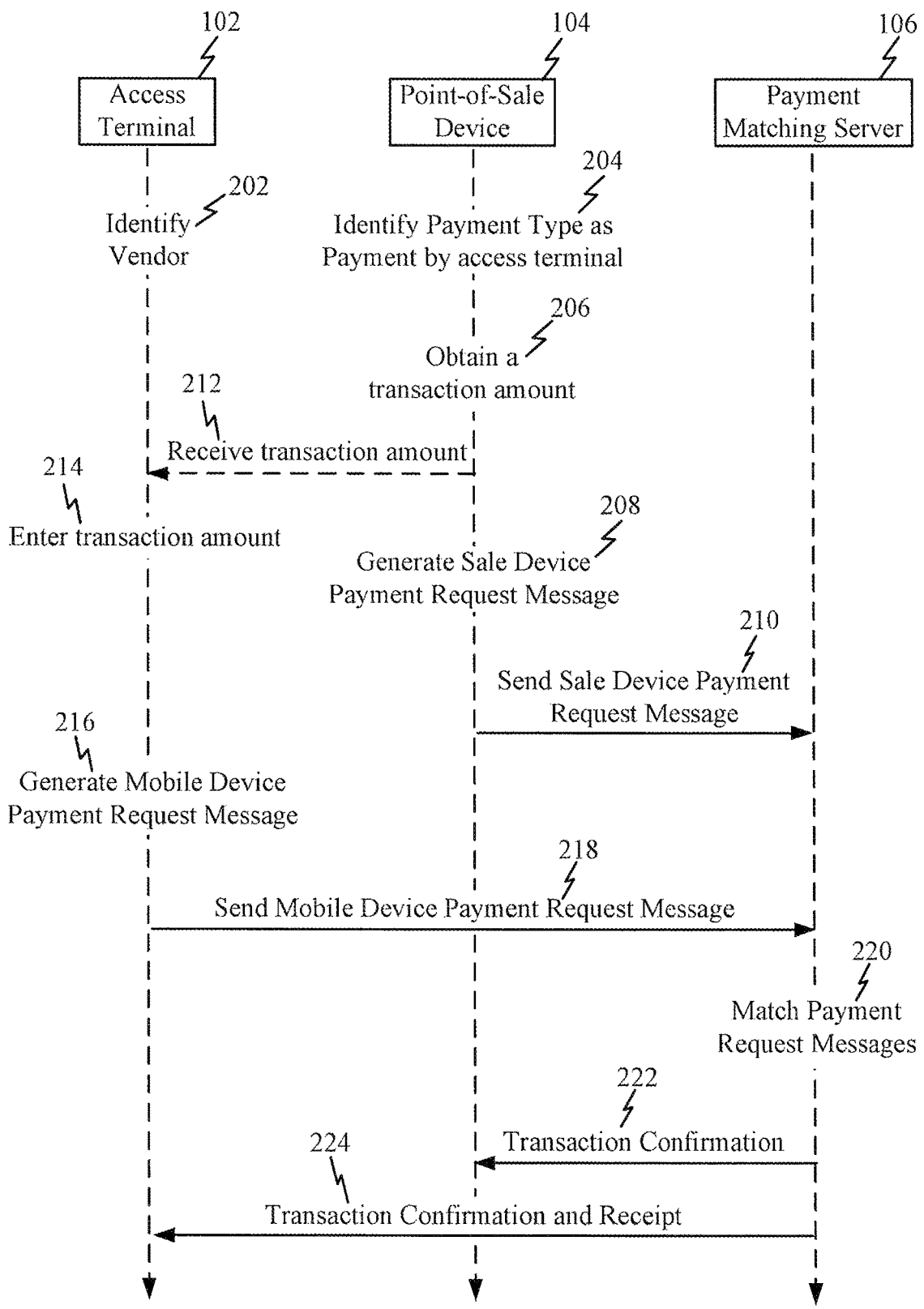
FIG. 2 is a flow diagram illustrating the authentication and authorization of a payment transaction performed with an access terminal.

FIG. 2 is a flow diagram illustrating the authentication and authorization of a payment transaction performed with an access terminal. In this example, the access terminal 102, point-of-sale device 104, and payment matching server 106 of FIG. 1 are used for illustration purposes. As part of a payment transaction, the access terminal 102 may identify a vendor 202 with which to perform the payment transaction. Information identifying the vendor may, in some implementations be manually input into a payment application operating in the access terminal 102. In other implementations, such information may be obtained from a point-of-sale device 104 by utilizing a communication link (e.g., near-field communication link) between the access terminal 102 and the point-of-sale device 104. Such information identifying a vendor may include the name of the vendor. The name of the vendor may be specific, for example, a specific vendor at a specific location. The name of the vendor may also include the name for general application, for example, a supermarket chain regardless of the geographical location of the specific market. Alternatively, the information identifying a vendor may include geographical coordinates of a specific vendor with or without regard to the name of the vendor. In another aspect, the information identifying a vendor may include geographical coordinates of a geographical area in which the user conducts a number of financial transactions, for example, a shopping center in which the user may purchase coffee, shop for groceries, and purchase gasoline. Note that, in alternative implementations, this step may be implicit as the access terminal 102 and point-of-sale device 104 can be matched based on the respective location or position information (e.g., SPS information).

The point-of-sale device 104 may also determine or identify the payment type 204, such that the point-of-sale device 104 knows that a customer wishes to make payment via the access terminal 102. This may be done, for example, by the user of the access terminal 102 informing the point-of-sale device 104 or an operator of the point-of-sale device 104 (e.g., verbally, physically, wirelessly or electronically) that payment will be performed via the access terminal 102. In at least some implementations, a user of the access terminal 102 informs an operator of the point-of-sale device 104 (cashier) that the customer wishes to pay via the access terminal 102, whereupon the operator of the point-of-sale device 104 inputs a payment instrument replacement into the point-of-sale device 104 to identify the transaction as a transaction being performed with an access terminal 102. For example, the operator of the point-of-sale device 104 may scan the payment instrument replacement with the point-of-sale device 104 in a manner suitable for the particular embodiment of the payment instrument replacement (e.g., swipe a magnetic stripe card through a card reader, place a proximity token within close proximity to a proximity sensor, etc.).

The point-of-sale device 104 may then obtain or generate a transaction or payment amount 206. For example, this may be the amount due for the purchase of one or more items. The point-of-sale device 104 may then generate a first (or sale device) payment request message 208 comprising transaction information (e.g., amount due, transaction identifier, vendor identifier, and/or location information, etc.) and sends the sale device payment request message 210 to the payment matching server 106.

The access terminal 102 may receive and enter 214 the transaction amount. This may be done, for example, by the user of the access terminal 102 manually entering the amount due into a payment application operating in the access terminal 102. In other implementations, the access terminal 102 may receive 212 and enter 214 the transaction amount through a communication link between the access terminal 102 and the point-of-sale device 104 (e.g., near-field communication link).

The access terminal 102 may then generate a second (or mobile device) payment request message 216 comprising transaction information (e.g., transaction amount, payment instrument information, account information, access terminal location, authentication information for the user, and/or vendor identifier, etc.). The mobile device payment request message may then be sent 218 to the payment matching server 106.

The payment matching server 106 then matches the received payment request messages 220 and finalizes payment of the transaction. The payment matching server 106 may authenticate the user and/or access terminal to make sure the payment transaction is authorized. For example, the payment matching server 106 may compare the amount due to the transaction amount, the location information to the access terminal location, and/or the vendor identifier to verify such transaction information is at least substantially the same.

The payment matching server 106 may send a transaction confirmation message 222 to the point-of-sale device 104 and a transaction confirmation message 224 to the access terminal 102 when the transaction is concluded. The payment matching server 106 may also send a transaction receipt to the access terminal 102. The transaction receipt may include an electronic version of the transaction (e.g., items purchased, amounts, date, etc.). Alternatively, if the transaction fails (e.g., user's account has insufficient funds, user cannot be authenticated, etc.), the payment matching server 106 may send transaction denial messages to the point-of-sale device 104 and the access terminal 102.

Exemplary Transaction Authentication and Authorization System

Figure 3:
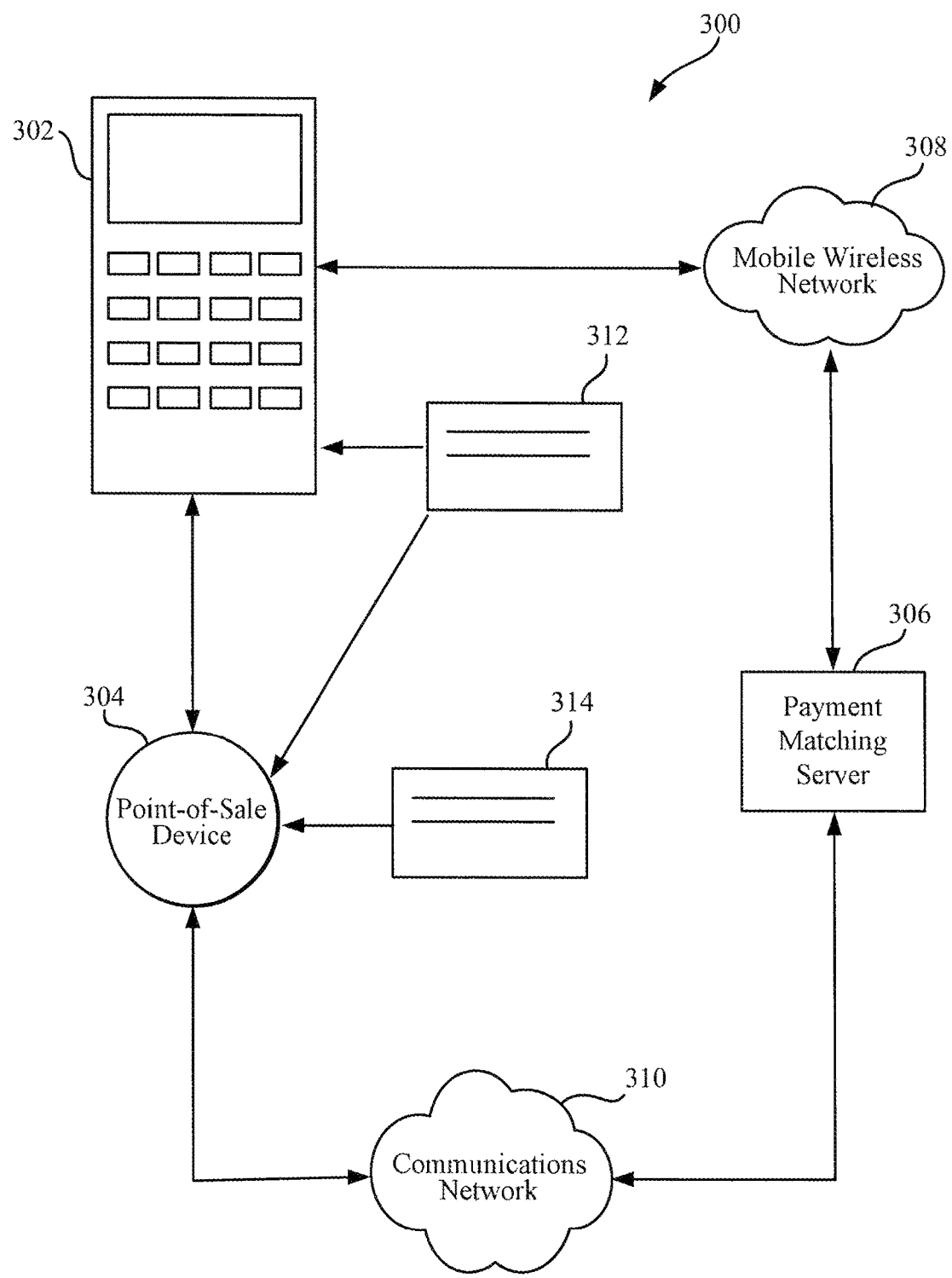
FIG. 3 is a block diagram illustrating a mobile commerce authentication and authorization system according to at least one example.

FIG. 3 is a block diagram illustrating a mobile commerce authentication and authorization system 300 according to at least one example. The authentication and authorization system 300 may be adapted to enable a user of an access terminal 302 to conclude authenticated and authorized purchases, and other commercial transactions, across a wireless communications system, where a vendor has a point-of-sale device 304 adapted to initiate such transactions. An example of a mobile commerce authentication and authorization system 300, as well as examples of suitable access terminals 302 (also referred to herein as mobile devices) and suitable payment matching servers 306 are described in U.S. patent application Ser. No. 12/194,844, the entire disclosure of which is incorporated herein by this reference.

The authentication and authorization system 300 generally includes an access terminal 302 and a point-of-sale device 304 adapted to initiate a payment transaction at approximately the same time. The access terminal 302 may be communicatively coupled to a payment matching server 306 via a mobile wireless network 308, and the point-of-sale device 304 may be communicatively coupled to the payment matching server 306 via a communications network 310. In some implementations, the mobile wireless network 308 and the communications network 310 may be the same general network, or at least one or more portions may be the same network (e.g., both may access the internet). The payment matching server 306 receives information from both the access terminal 302 and the point-of-sale device 304 and finalizes payment for the transaction.

The access terminal 302 is adapted to allow a consumer to effect payments across a credit network by charging a payment to one or more payment instruments 312 of the user, or to conduct and conclude such commercial transactions using any payment system desired by a consumer and acceptable to a vendor or merchant. The access terminal may send a mobile device payment request message to the payment matching server upon initiation of the payment transaction. Such a mobile device payment request message may include transaction information to be employed by the payment matching server 306 to authenticate and authorize the transaction. By way of example and not limitation, such transaction information may include a transaction amount, payment instrument information, account information, one or more location parameters of the access terminal, authentication information for the user, and/or a vendor identifier.

In order to provide, for example, payment instrument information and/or account information, the access terminal 302 may be adapted to store information associated with one or more payment instruments 312. For example, if the payment instrument 312 comprises a financial card, such as a credit card or debit card, the access terminal 302 may be adapted to obtain and store payment instrument information such as the primary account number associated with the card, the expiration date of the card and/or the name on the card, as well as other information. Accordingly, the authentication and authorization system 300 may enable a consumer to conclude a transaction, without having physical possession of the payment instrument 312.

The access terminal 302 may further be adapted to obtain one or more location parameters of the access terminal 302. Such location parameters may include the physical and geographical location of the access terminal 302 and may be determined by any technique, technology, or system, or any combination of techniques, technologies, or systems, known or as yet unknown, for determining location parameters. By way of example and not limitation, one or more location parameters may be determined by one or more satellite positioning systems ("SPS") (e.g., United States Global Positioning System ("GPS"), Russian Glonass system, European Galileo system), positioning determination systems that utilize pseudolites, a combination of satellites and pseudolites, ground-based (or terrestrial) systems, triangulation, Time Delay of Arrival, and Assisted GPS or any other means for discovering the location of access terminals. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, may include pseudolites, equivalents of pseudolites, and possibly others. The term "SPS signals", as used herein, may include SPS-like signals from pseudolites or equivalents of pseudolites.

Transactions effected using the access terminal 302 may be made anonymously by use of the location parameters for authentication and the relationship between the location parameters and a payment sum, thus obviating the need for conventional identification features such as a personal identification number, possession of a payment instrument, provision of a biometric identifier, or any comparable device or procedure. However, the mobile commerce authentication and authorization system 300 is fully capable of incorporating the use of such conventional identification features, and others not yet developed. Thus, for example, a user may be required by a vendor policy or carrier policy to enter a personal identification number ("PIN") using the mobile wireless communications instrument to further enhance the reliability of the authentication and authorization data provide by the mobile commerce authentication and authorization system of this document. Alternatively, the user may be required to enter additional information only for purchases exceeding a certain amount or other limitations. The mobile commerce authentication and authorization system is adaptable to include and process such additional requirements.

Information relating to the transaction amount may be obtained from the point-of-sale device 304. For example, the access terminal may employ compatible near field communications to communicate directly with the point-of-sale device 304 to obtain data and information from the point-of-sale device 304, including a transaction sum or amount. In other implementations, such data and information may be manually entered into the access terminal 302 by a user.

As noted above, the access terminal 302 obtains various data and information and sends at least some of the data or information via the mobile wireless network 308 to the payment matching server 306.

The point-of-sale device 304 is adapted to compute the transaction amount and send payment information for a transaction. The point-of-sale device may be mounted on a cashier check-out counter. According to one feature, the point-of-sale device 304 may comprise a legacy or existing device (e.g., credit card and debit card reader, automatic and automated teller machine) which does not require any structural modification to perform a payment transaction involving a mobile device (e.g., access terminal 302). Accordingly, the point-of-sale device 304 may be adapted to receive payment information directly from a payment instrument 312. For example, the point-of-sale device 304 may be adapted to read data directly from a payment instrument 312 comprising a conventional credit card or bank card.

The point-of-sale device 304 is further adapted to receive information from a payment instrument replacement 314. To indicate to the point-of-sale device 304 that a special transaction (involving an access terminal 302) will be performed, a payment instrument replacement 314 is used instead of the typical payment instrument 312. The payment instrument replacement 314 may include information that remains the same regardless of the particular customer, as opposed to a conventional payment instrument 312 which includes information that is specific to the particular customer (e.g., credit/bank card having account information and/or customer information). Various types of payment instrument replacements are contemplated herein which allow an operator (cashier) to initiate a transaction involving an access terminal 302 for authentication and/or authorization. That is, the payment instrument replacement 314 allows the operator (cashier) to indicate to the point-of-sale device 304 that a special transaction is being initiated while using existing or legacy forms of inputs (e.g., card readers, scanning system, proximity detector, etc.).

Physically, one example of the payment instrument replacement 314 may be a magnetic stripe card that looks like a credit card or debit card. However, the card may include information to trigger a transaction using the external payment matching server 306. That is, the card comprising the payment instrument replacement 314 may be similar to a magnetic stripe card (e.g., like a credit card or debit card) or proximity card utilized for conventional financial transactions. Such a card may be issued to the operator (e.g., cashier) of the point-of-sale device 304 and is utilized when a customer wishes to perform a payment transaction using an access terminal 302. The payment instrument replacement 314 may include information stored therein, which information may be shared among all point-of-sale device operators (e.g., cashiers), may be unique to each particular vendor, or may be unique to each particular point-of-sale device operator. In embodiments in which the payment instrument replacement 314 comprises a magnetic stripe card, such stored information may be encoded in track 1 and/or track 2 of the magnetic stripe.

When the customer indicates that payment is to be made via the customer's access terminal 302, the operator of the point-of-sale device 304 uses the payment instrument replacement 314 on the point-of-sale device 304. The information stored in the payment instrument replacement 314 may cause an external payment processing server to recognize that the requested transaction involves an access terminal 302 for payment authentication and/or authorization. In one example, the external payment processing server may be co-located with the external payment matching server 306. Alternatively, the external payment processing server may forward the transaction to the payment matching server 306. The point-of-sale device 304 may send a sale device payment request message to the payment transaction server or payment matching server 306 via the communication network 310. Such a sale device payment request message may include, for example, a transaction amount due, a transaction identifier, a transaction time, a transaction date, a vendor name, a vendor identifier, vendor location information and/or a cashier identifier.

The payment matching server 306 awaits payment request messages from both the access terminal 302 and the pointof-sale device 304 prior to confirming or denying the transaction. The payment matching server 306 may be communicatively coupled to the mobile wireless network 308 and the communications network 310 to facilitate processing of a transaction involving the access terminal 302 and the point-of-sale device 304. For example, the payment matching server 306 may be adapted to receive the mobile device payment request message from the access terminal 302 and the sale device payment request message from the point-of-sale device 304. Upon receipt of both messages, the payment matching server 306 may verify that at least some of the information from the two messages matches. For example, the payment matching server 306 may verify that the transaction amount and/or at least one location parameter in the two messages match in order to authenticate and authorize the payment transaction The payment matching server 306 is further adapted to notify the access terminal 302 and the point-of-sale device 304 whether the information from the two messages sufficiently match to authenticate and authorize the transaction.

Figure 4:
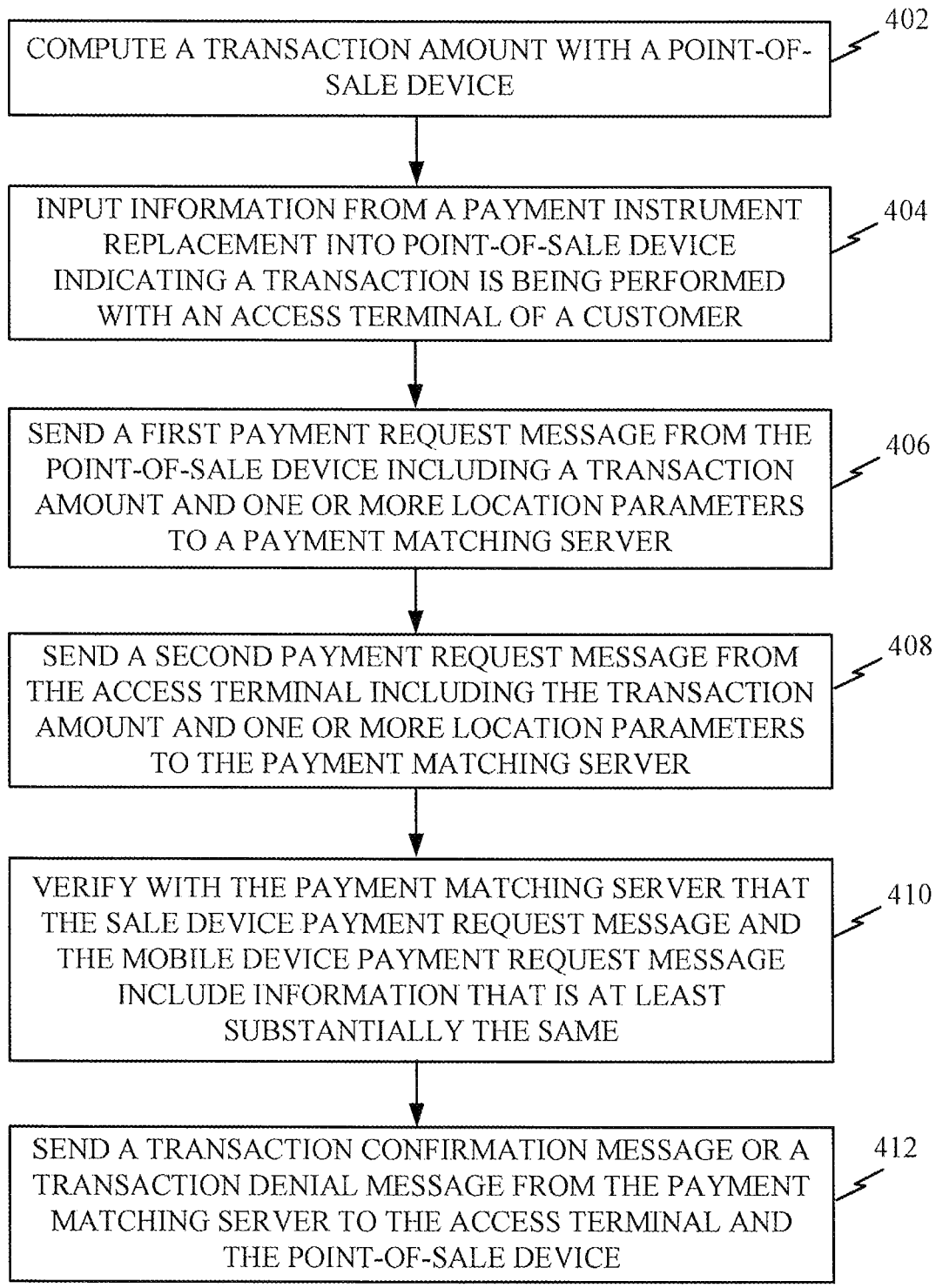
FIG. 4 illustrates a method operational of a transaction authentication and authorization system.

FIG. 4 illustrates a method operational of a transaction authentication and authorization system. Referring to both FIGS. 3 and 4, authentication and/or authorizing of a payment transaction performed with an access terminal will be described according to one example. Initially, a transaction amount may be computed 402 at a point-of-sale device 304. Information may be input from a payment instrument replacement 314 into the point-of-sale device 304, which information indicates that the payment transaction is being performed with an access terminal 302. For example, a consumer may indicate to an operator (cashier) at the point-of-sale device 304 that payment is to be made via the customer's access terminal 302. Whereupon, the operator at the point-of-sale device 304 may use the payment instrument replacement 314 on the point-of-sale device 304.

The point-of-sale device may be adapted to generate and send 406 a sale device payment request message from the point-of-sale device 304 to a payment matching server 306. The payment request message may include at least the transaction amount and at least one location parameter relating to the point-of-sale device 304. The access terminal 302 may also send a mobile device payment request message 408 from the access terminal 302 to the payment matching server 306. The mobile device payment request message may include the transaction amount and at least one location parameter relating to the access terminal 302.

The payment matching server 306 may receive both the sale device payment request message and the mobile device payment request message and may compare the information from the two messages. In particular, the payment matching server 306 may compare the transaction amount and the one or more location parameters from the two messages to verify 410 that they are substantially similar (e.g., the same transaction amount and at least substantially the location parameter(s)). The payment matching server 306 may send a transaction confirmation message 412 to the point-of-sale device 304 and to the access terminal 302 when the transaction is concluded. The payment matching server 306 may also send a transaction receipt to the access terminal 302. The transaction receipt may include an electronic version of the transaction (e.g., items purchased, amounts, date, etc.). Alternatively, if the transaction fails (e.g., user's account has insufficient funds, user cannot be authenticated, etc.), the payment matching server 306 may send transaction denial messages 412 to the point-of-sale device 304 and the access terminal 302.

Exemplary Point-of-Sale Device

Figure 5:
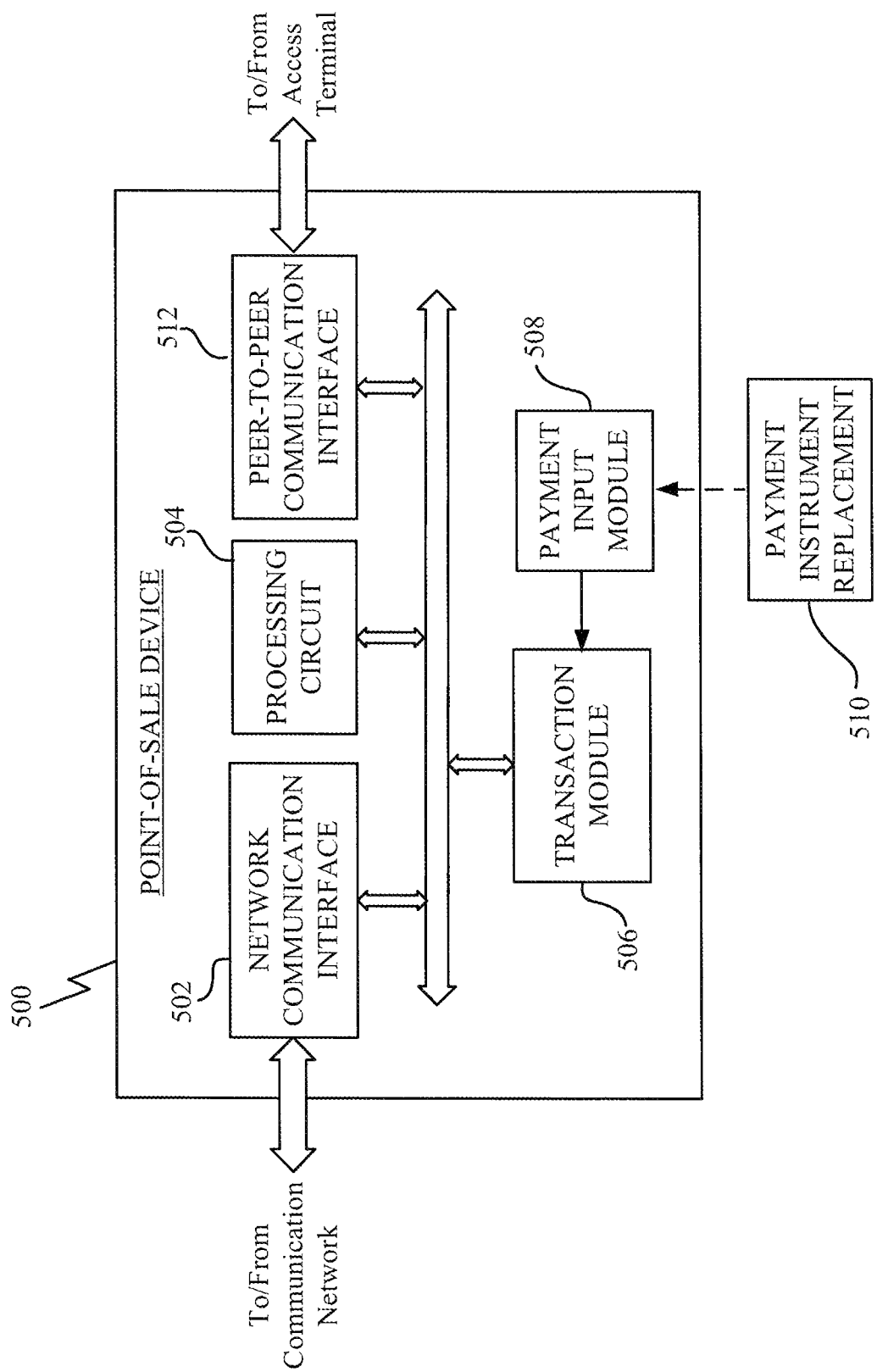
FIG. 5 is a block diagram illustrating a point-of-sale device according to one example.

FIG. 5 is a block diagram illustrating a point-of-sale device according to one example. The point-of-sale device 500 may include a network communication interface 502, a processing circuit 504, a transaction module 506, and a payment input module 508. The network communication interface 502 may enable the point-of-sale device 500 to communicate over a wired or wireless network to process transactions (e.g., process credit card or bank card payments, etc.).

The transaction module 506 may be coupled to the payment input module 508 to receive payment information for a transaction, e.g., via a payment instrument such as a magnetic stripe or proximity card. In one example, the point-of-sale device 500 may be a legacy or existing device which does not require any structural modification to perform a payment transaction involving an access terminal. To indicate to the point-of-sale device 500 that a special transaction (involving an access terminal) will be performed, a payment instrument replacement 510 (e.g., magnetic stripe card, token, etc.) is used instead of the typical payment instrument (e.g., credit card or bank card). As noted above, various types of payment instrument replacements are contemplated herein which allow an operator (cashier) to initiate a transaction involving a mobile device for authentication and/or authorization. That is the payment instrument replacement allows the operator (cashier) to indicate to the point-of-sale device 500 that a special transaction is being initiated while using existing or legacy forms of inputs (e.g., card readers, scanning system, proximity detector, etc.).

The processing circuit 504 may be adapted to perform one or more operations to allow the point-of-sale device 500 to, for example, add the amount of items for a transaction and process a payment in conjunction the transaction module 506. For example, the processing circuit 504 may be adapted to compute the transaction amount and send a payment request message via the network communication interface 502. As noted previously, when a payment instrument replacement 510 is received at the payment input module 508, the payment request message may include at least the transaction amount and one or more location parameters (e.g., vendor name, vendor identifier, vendor location information, cashier identifier).

According to at least one optional feature, the point-of-sale device 500 may include a peer-to-peer communication interface 512 coupled with the processing circuit 504. The peer-to-peer communication interface may comprise wireless communication interface and/or transmitter/receiver chain that facilitates sending and/or receiving over-the-air transmissions. The peer-to-peer communication interface 512 may be adapted for near field communications with one or more external devices, such as an access terminal. Accordingly, the processing circuit 504 may be adapted to establish a wireless communication link with one or more access terminals via the peer-to-peer communication interface 512 and to send one or more messages (e.g., a transaction amount) to an access terminal.

Figure 6:
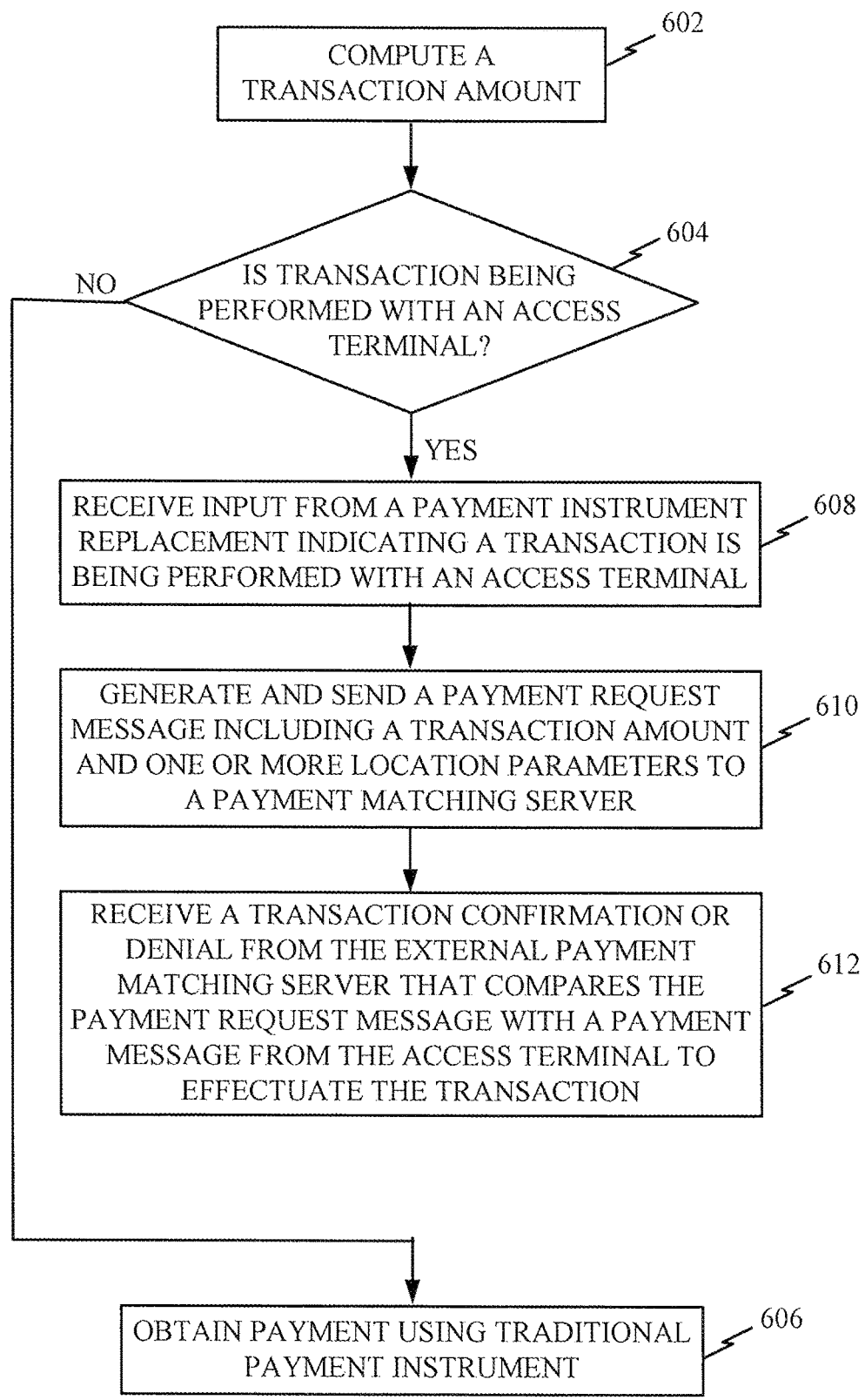
FIG. 6 illustrates a method operational on a point-of-sale device for processing a payment transaction involving an access terminal for authentication and/or authorization for the payment transaction.

FIG. 6 illustrates a method operational on a point-of-sale device for processing a payment transaction involving an access terminal for authenticating and/or authorizing the payment transaction. The point-of-sale device may first compute a transaction amount 602. Then, the operator (e.g., cashier) may determine whether the transaction is to be performed with an access terminal 604. That is, the operator may inquire the form of payment that the customer will use to pay for the transaction. If the customer selects a traditional payment instrument (e.g., cash, credit card, bank card, etc.), the point-of-sale device obtains payment using the traditional payment instrument 606. Otherwise, if the customer wishes to use an access terminal to perform (e.g., authenticate and/or authorize) the transaction, then the operator (cashier) may uses a specially configured card or payment instrument replacement to trigger processing by an external payment matching server. That is, the point-of-sale device may receive an input from a payment instrument replacement which indicates that the transaction is being performed with an access terminal 608. The input from the payment instrument replacement does not include any account specific information relating to a particular customer. That is, the input is not associated with any particular customer account. Rather, the input from the payment instrument replacement is the same for any customer, irrespective of each particular customer's identity.

The point of sale device then generates and sends a payment request message over a network to a payment matching server, the payment request including the transaction amount and one or more location parameters (e.g., vendor name, vendor identifier, vendor location, approximate geographical location, and/or point-of-sale device location), to authenticate and/or authorize the payment transaction 610. The payment request may also include other parameters, such as a transaction date, a transaction time, transaction identifier, etc. The point-of-sale device may then receive a transaction confirmation (if the transaction is accepted) or a transaction denial (if the transaction is rejected) from the external payment matching server 612.

Exemplary Access Terminal

Figure 7:
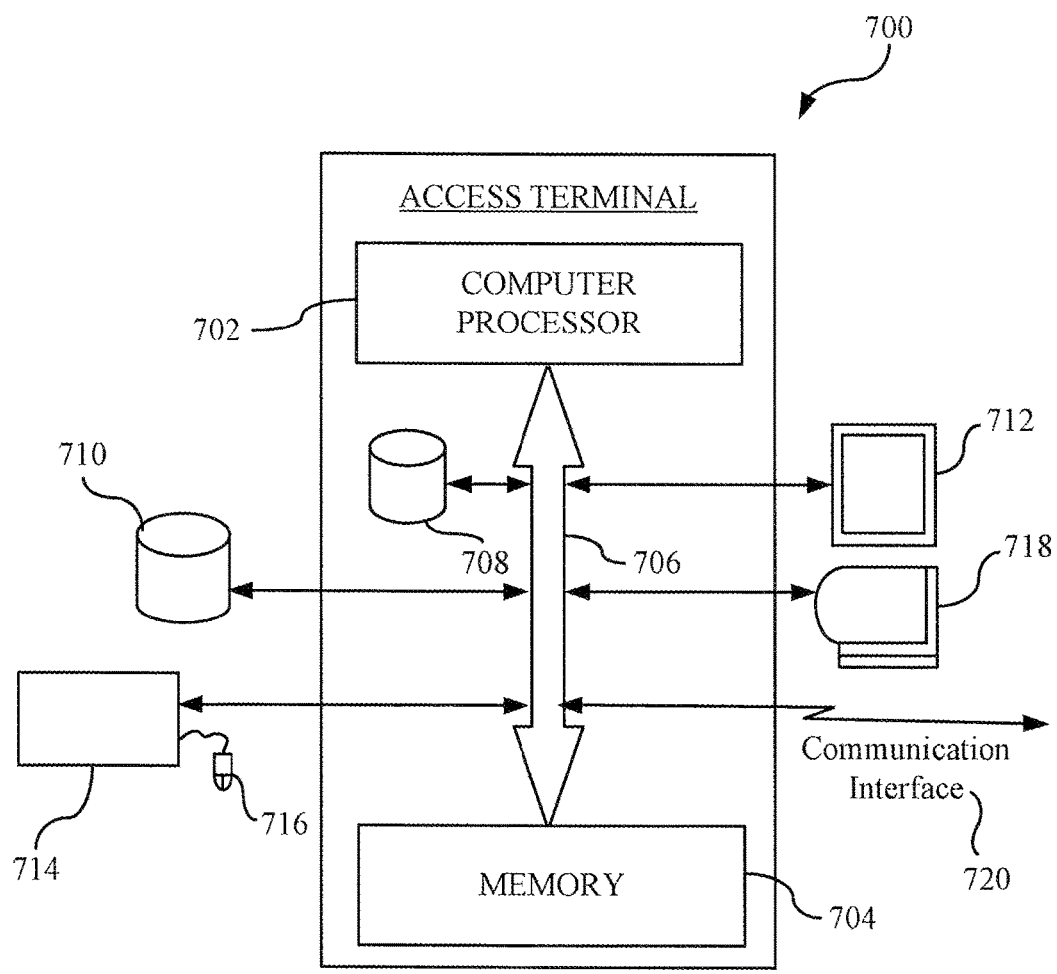
FIG. 7 is a block diagram illustrating an access terminal according to one example.

FIG. 7 is a block diagram illustrating an access terminal according to one example. The access terminal 700 may be adapted to transmit and receive programmable instructions in connection with one more payment instruments (e.g. payment instrument 312 in FIG. 3). Any and all data electronically or otherwise embedded in and on the one or more payment instruments 312 as well as any other data associated with a customer, a financial institution, and/or a card association, may be stored in the access terminal 700 for use in a commercial transaction.

The access terminal 700 may include a variety of components to enable it to send and receive data and information across a mobile wireless network, as well as with a point-of-sale device. The access terminal 700 includes a computer processor 702 and memory 704 connected by a bus 706. The memory 704 may comprise a relatively high speed machine readable medium and may includes volatile memories such as DRAM, and SRAM, as well as non-volatile memories such as ROM, FLASH, EPROM, EEPROM, and bubble memory. Also connectable to the bus 706 are optional secondary storage 708, external storage 710, output devices such as a first monitor 712 that may be mounted on the access terminal 700, and in optional configurations an input device such as a keyboard 714 with a mouse 716, and perhaps even a printer 718. Secondary storage 708 may include machine-readable media such as a hard disk drive, a magnetic drum, and a bubble memory. External storage 710 may include machine-readable media such as a floppy disk, a removable hard drive, a magnetic tape, CS-ROM, and even other computers, possibly connected via a (wired or wireless) communications interface 720. The distinction between secondary storage 708 and external storage 710 is primarily for convenience in describing the invention. As such, a person skilled in the art will appreciate that there is substantial functional overlap between and among the components. Computer software and user programs can be stored in a software storage medium such as memory 704, secondary storage 708, and external storage 710. Executable versions of computer software can be read from a storage medium such as non-volatile memory, loaded for execution directly into volatile memory, executed directly out of non-volatile memory, or stored on the secondary storage 708 prior to loading into volatile memory for execution.

Exemplary Payment Instrument Replacement

Figure 8:
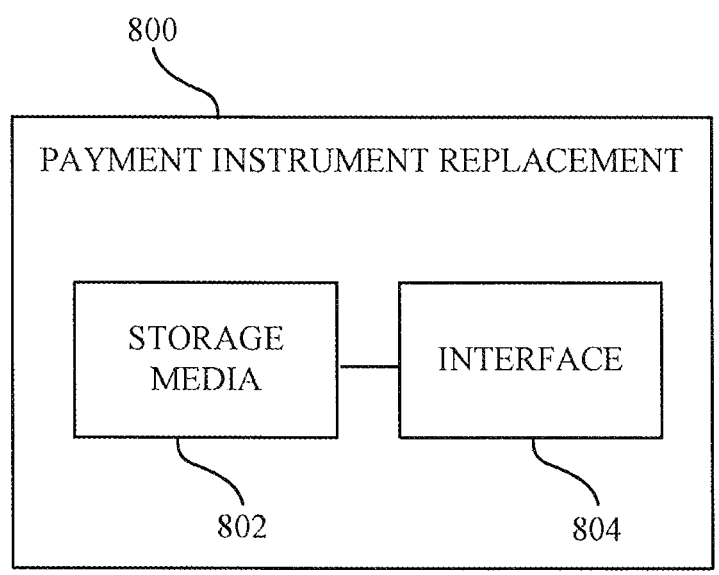
FIG. 8 is a block diagram illustrating a payment instrument replacement according to one example.

FIG. 8 is a block diagram illustrating a payment instrument replacement according to one example. The payment instrument replacement 800 may be adapted to be received by a payment module of a point-of-sale device (e.g., payment module 508 in FIG. 5). The payment instrument replacement 800 may include a storage media 802 for storing information (e.g., instructions) that is readable by a machine, such as a point-of-sale device. Such information may be adapted to trigger processing of a payment transaction at a point-of-sale device by a payment matching server, such as a payment matching server 306 of FIG. 3. For example, the information may include data which may cause the point-of-sale device to generate a payment request message, and may direct the point-of-sale device to send the payment request message to a particular payment matching server.

As noted above, the payment information may include information that remains the same, irrespective of the particular customer or customer's identity. This is contrary to a conventional payment instrument, which typically includes information that is specific to the particular customer (e.g., credit/bank card having account information and/or customer information). According to one feature, the information may include one or more location parameters. Such location parameters may include a vendor name, a vendor identifier, a vendor location (e.g., a geographical location), and/or a cashier identifier.

The payment instrument replacement 800 may further include an interface 804 adapted to be readable by a machine, such as a point-of-sale device, to enable the machine to obtain (or read) the information from the storage media 802 of the payment instrument replacement 800. Various types of interfaces 804 are contemplated herein which allow a machine (e.g., point-of-sale device) to read the information from the storage media 802. By way of example and not limitation, the interface 804 may include at least one magnetic stripe (e.g., magnetic stripe card) and/or a radio frequency interface (e.g. proximity token or proximity card).

Figure 9:
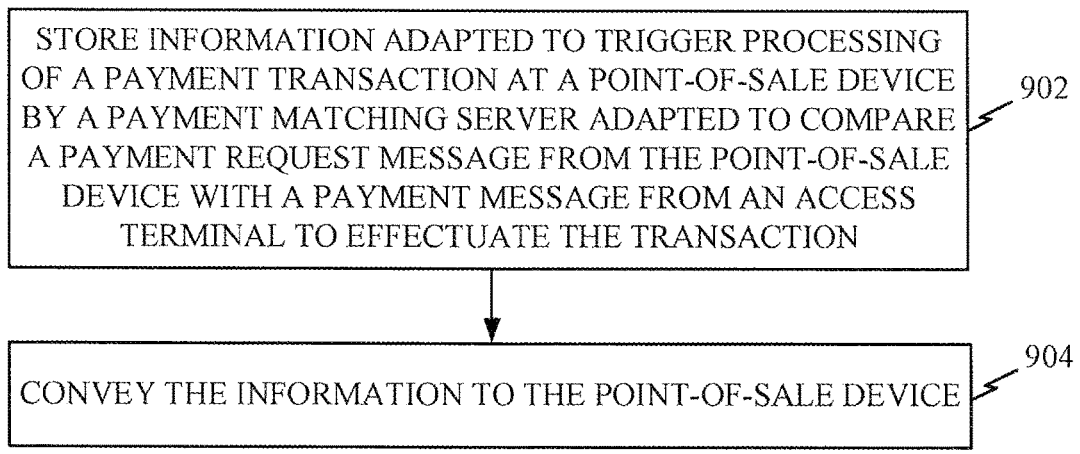
FIG. 9 illustrates a method of using a payment instrument replacement for facilitating a payment transaction involving an access terminal.

FIG. 9 illustrates a method of using a payment instrument replacement for facilitating a payment transaction involving an access terminal. According to the illustrated example, information may be stored on the payment instrument replacement 902. Such information may be adapted to trigger processing of a payment transaction at the point-of-sale device by a payment matching server that compares a payment request message from the point-of-sale device with a payment message from an access terminal to effectuate the transaction. The information may then be conveyed to the point-of-sale device 904. For example, the payment instrument replacement may be swiped in a card reader at the point-of-sale device, or held within proximity of a proximity token detector at the point-of-sale device.

One or more of the components, steps, features and/or functions illustrated in FIGS. 1, 2, 3, 4, 5, 6, 7, 8 and/or 9 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 3, 5, 7 and/or 8 may be configured to perform one or more of the methods, features, or steps described in FIGS. 2, 4, 6 and/or 9. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a non-transitory storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a point-of-sale device for facilitating a payment transaction, the method comprising:
   computing, by the point-of-sale device, a transaction amount;
   receiving, at the point-of-sale device, an input from a payment instrument replacement that indicates a payment transaction is being performed with an access terminal and without a customer payment instrument, wherein receiving the input from the payment instrument replacement comprises reading the payment instrument replacement using a component of the point-of-sale device configured to read the customer payment instrument;
   generating, by the point-of-sale device, a payment request message including the transaction amount and one or more location parameters, the payment request message comprising no customer-specific information and no account-specific information;
   sending, by the point-of-sale device, the payment request message to a payment matching server;
   establishing a wireless communication link with the access terminal from the point-of-sale device; and
   providing, by the point-of-sale device, vendor identifying information and the transaction amount to the access terminal via the wireless communication link.

2. The method of claim 1, wherein receiving the input comprises receiving the input excluding an identification of a customer account.

3. The method of claim 1, wherein generating the payment request message including the transaction amount and one or more location parameters comprises generating the payment request message including one or more location parameters that include at least one of a vendor name, a vendor identifier, a vendor location or a cashier identifier.

4. The method of claim 3, wherein the vendor identifier includes a geographical location indicating a location of the point-of-sale device.

5. The method of claim 1, further comprising generating the payment request message to further include at least one of a transaction identifier, a transaction time or a transaction date.

6. The method of claim 1, further comprising receiving a transaction confirmation from the payment matching server.

7. The method of claim 1 wherein sending the payment request message comprises sending the payment request message independent of an identity of a customer of the transaction.

8. The method of claim 1, wherein the vendor identifying information includes at least one of a vendor name or a vendor identifier.

9. The method of claim 1, wherein establishing a wireless communication link with the access terminal comprises establishing a near-field wireless communication link.

10. The method of claim 1, wherein the payment instrument replacement comprises non-customer specific and non-account specific information that triggers the processing of the payment transaction by the point-of-sale device using the payment matching server.

11. A point-of-sale device for facilitating a payment transaction, comprising:
   means for computing a transaction amount by the point-of-sale device;
   means for receiving, by the point-of-sale device, an input from a payment instrument replacement when a customer requests payment by using an access terminal without a payment instrument of the customer, wherein the means for receiving the input from the payment instrument replacement comprises means for reading the payment instrument replacement using a component of the point-of-sale device configured to read the customer payment instrument;
   means for generating a payment request message including the transaction amount and one or more location parameters, the payment request message comprising no customer-specific information and no account-specific information;
   means for sending the payment request message to a payment matching server;
   means for establishing a wireless communication link with the access terminal by the point-of-sale device; and
   means for providing vendor identifying information and the transaction amount to the access terminal via the wireless communication link by the point-of-sale device.

12. The point-of-sale device of claim 11, wherein the input indicates that the payment transaction should be performed using the payment matching server.

13. The point-of-sale device of claim 11, wherein the input is the same for all customers.

14. The point-of-sale device of claim 11, wherein the one or more location parameters includes at least one of a vendor name, a vendor identifier, a vendor location or a cashier identifier.

15. A machine-readable medium comprising instructions operational on a point-of-sale device for facilitating a payment transaction, which when executed by a processor causes the processor to:
   receive, at the point-of-sale device, an input from a payment instrument replacement that indicates that a customer is using an access terminal for payment without a payment instrument of the customer, wherein the processor is configured to read the payment instrument replacement using a component of the point-of-sale device configured to read the customer payment instrument;
   generate, at the point-of-sale device, a payment request message when the input is received, the payment request message including a transaction amount and one or more location parameters, the payment request message comprising no customer-specific information and no account-specific information;
   send from the point-of-sale device the payment request message to a payment matching server;
   establish a wireless communication link with the access terminal from the point-of-sale device; and
   provide vendor identifying information and the transaction amount to the access terminal via the wireless communication link by the point-of-sale device.

16. The machine-readable medium of claim 15, wherein the input is the same for all customers.

* * * * *